United States Patent
Wilkins

[11] Patent Number: 5,960,823
[45] Date of Patent: Oct. 5, 1999

[54] TANK VACUUM LIMITER ASSEMBLY

[75] Inventor: Larry C. Wilkins, Georgetown, Ind.

[73] Assignee: Electromechanical Research Laboratories, Inc., New Albany, Ind.

[21] Appl. No.: 09/120,248

[22] Filed: Jul. 21, 1998

[51] Int. Cl.⁶ .................................................. F16K 15/00
[52] U.S. Cl. ...................... 137/516.25; 137/526; 251/363
[58] Field of Search .............. 137/516.25, 541, 137/516.29, 526, 542; 251/363, 168, 186, 900; 277/910, 913, 946

[56] References Cited

U.S. PATENT DOCUMENTS

| | | | |
|---|---|---|---|
| 1,692,151 | 11/1928 | Benham | 137/526 |
| 1,949,874 | 3/1934 | Paterson et al. | 137/516.25 X |
| 2,093,662 | 9/1937 | Steirly | 137/516.29 |
| 2,263,750 | 11/1941 | Willke | 137/516.25 X |
| 2,599,622 | 6/1952 | Folmsbee | 137/541 |
| 3,131,718 | 5/1964 | Mingrone | 137/516.29 X |
| 3,532,115 | 10/1970 | Hodil | 137/516.25 |
| 3,548,868 | 12/1970 | Mullaney | 137/516.29 X |
| 3,605,132 | 9/1971 | Lineback | 137/526 |
| 3,626,977 | 12/1971 | Riley et al. | 137/516.25 |
| 4,518,329 | 5/1985 | Weaver | 137/516.25 X |
| 4,674,575 | 6/1987 | Guess | 137/516.29 X |
| 4,676,266 | 6/1987 | Johnson | 137/516.25 X |
| 4,691,734 | 9/1987 | Fort | 251/900 X |

*Primary Examiner*—Denise L. Ferensic
*Assistant Examiner*—Ramyar Farid
*Attorney, Agent, or Firm*—Woodard, Emhardt, Naughton Moriarty & McNett Patent and Trademark Attorneys

[57] ABSTRACT

A vacuum limiter valve assembly has a valve body screwed into an opening on a cargo tank. It has a relatively soft elastomeric, lightly spring-loaded seal closing the passageway through the valve body between the tank interior and the surrounding environment outside the tank. The relatively small area of the seal which would otherwise be exposed to tank cargo or vapors therefrom, is protected by a shield of material which is relatively inert and unaffected by most known chemicals, but also capable of a sealing function. The shield does not interfere with the normal sealing function, nor does it interfere with the opening of the vacuum limiter valve when needed to avoid development of excessive vacuum in the tank.

3 Claims, 4 Drawing Sheets

TANK VACUUM LIMITER ASSEMBLY

BACKGROUND OF THE INVENTION

This invention relates generally to storage tanks, and more particularly to a valve for preventing development of excessive vacuum in a tank.

DESCRIPTION OF THE PRIOR ART

It is well known that there are some conditions in which a vacuum will develop in a railroad tank car. An example is a tank car which has a vapor or gas in it at one temperature, and is closed and sealed and then is exposed to a much lower temperature. One example of such an event occurs when the tank car is moved from a sunny hot environment to a cold, dark environment, as can occur in transportation from a desert area in the daylight to a mountainous area at night. Another example is where a tank car is steam cleaned inside a building and then sealed to prevent contamination, and is moved outside the building into a cold environment.

To avoid the problem of generation of excessive pressure differences between the outside and the inside of a tank car, valves have been used and which are screwed into a pipe fitting in the wall of a tank car, typically at the top. These valves normally seal the tank car to prevent escape of contents. In fact, they are capable of handling pressures in excess of 100 psi inside the tank. But they are designed to open upon development of a pressure differential of as low as 10 psi in the opposite direction so that, if a vacuum begins to develop in a tank car, the valve will open and admit air from the atmosphere into the tank. These valves are spring-loaded to keep them shut in normal use and in the absence of a pressure inside the tank that would keep them closed anyway. Since such valves are only lightly spring loaded, it is important that the valve seal-to-seat engagement be reliable. That usually requires a somewhat soft seal material. However, most such seal materials in current use are susceptible to deterioration from exposure to the contents or the vapors from the tank contents which are constantly present at the seal-to-seat junction. Also, during loading of the tank with liquid cargo, and during transportation of the loaded tank over the road, rails or water, some sloshing of the contents may also put the liquid itself in direct contact with the edge of the seal.

Although these seals are supposed to be checked regularly, the fact of the matter is that there is no certainty of the regularity of checking of the seals for their integrity. Therefore, it is an object of the present invention to provide an arrangement for reliably sealing the vacuum limiter in normal operation of a cargo tank, and maintaining integrity of the seal.

SUMMARY OF THE INVENTION

Described briefly, according to a typical embodiment of the present invention, a vacuum limiter valve assembly includes a valve body readily installed on a cargo tank and having a contoured seat engaged by a relatively soft elastomeric, lightly spring-loaded primary seal. The relatively small area of the seal which would otherwise be exposed to tank cargo or vapors therefrom, is protected by a shield of material which is relatively inert and unaffected by most known chemicals, but also capable of a sealing function. The shield does not interfere with the normal sealing function, nor does it interfere with the opening of the vacuum limiter valve when needed to avoid development of excessive vacuum in the tank.

DESCRIPTION OF THE PREFERRED EMBODIMENT

Figure 1:
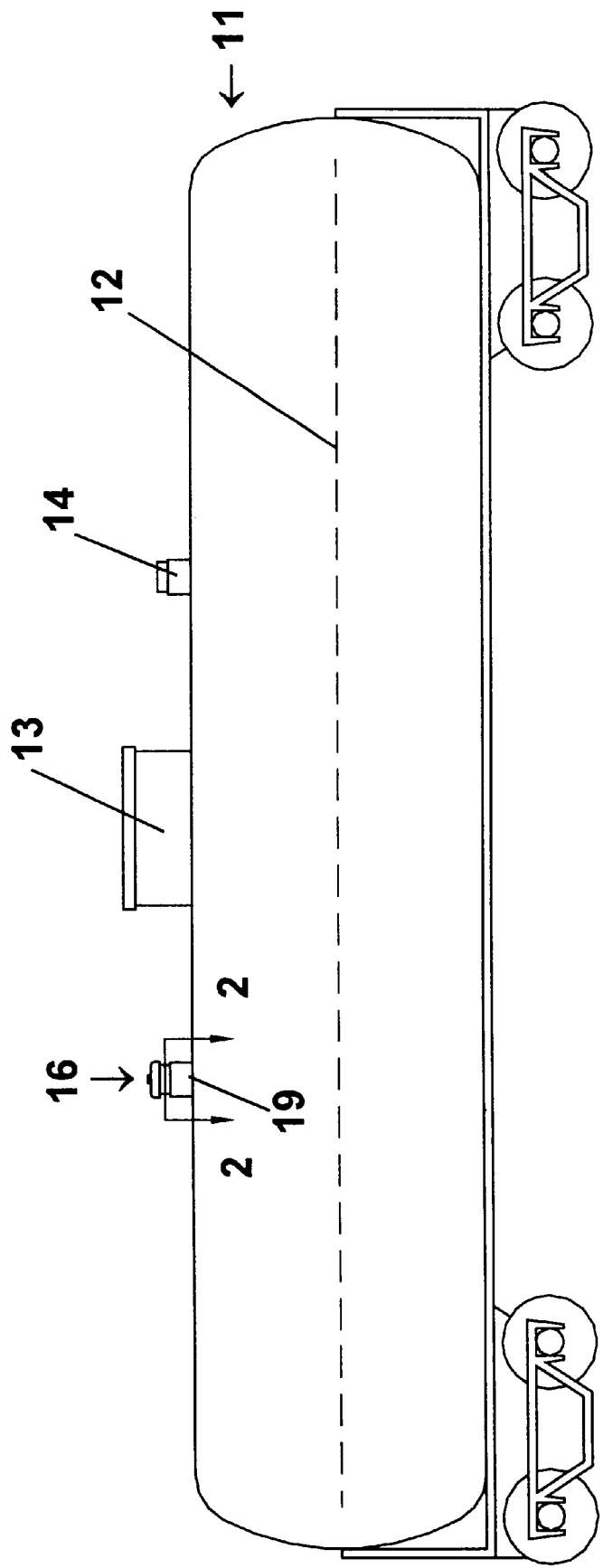
FIG. 1 is a schematic side-elevational view of a railroad tank car with the vacuum limiter assembly according to the present invention, installed thereon.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, and more particularly FIG. 1, a railroad tank car 11 is shown with a liquid cargo whose level is indicated schematically by the line 12. A manway/fill opening 13 is provided in the top, as is a pressure relief valve 14, and the vacuum limiter assembly 16 according to a typical embodiment of the present invention.

Figure 2:
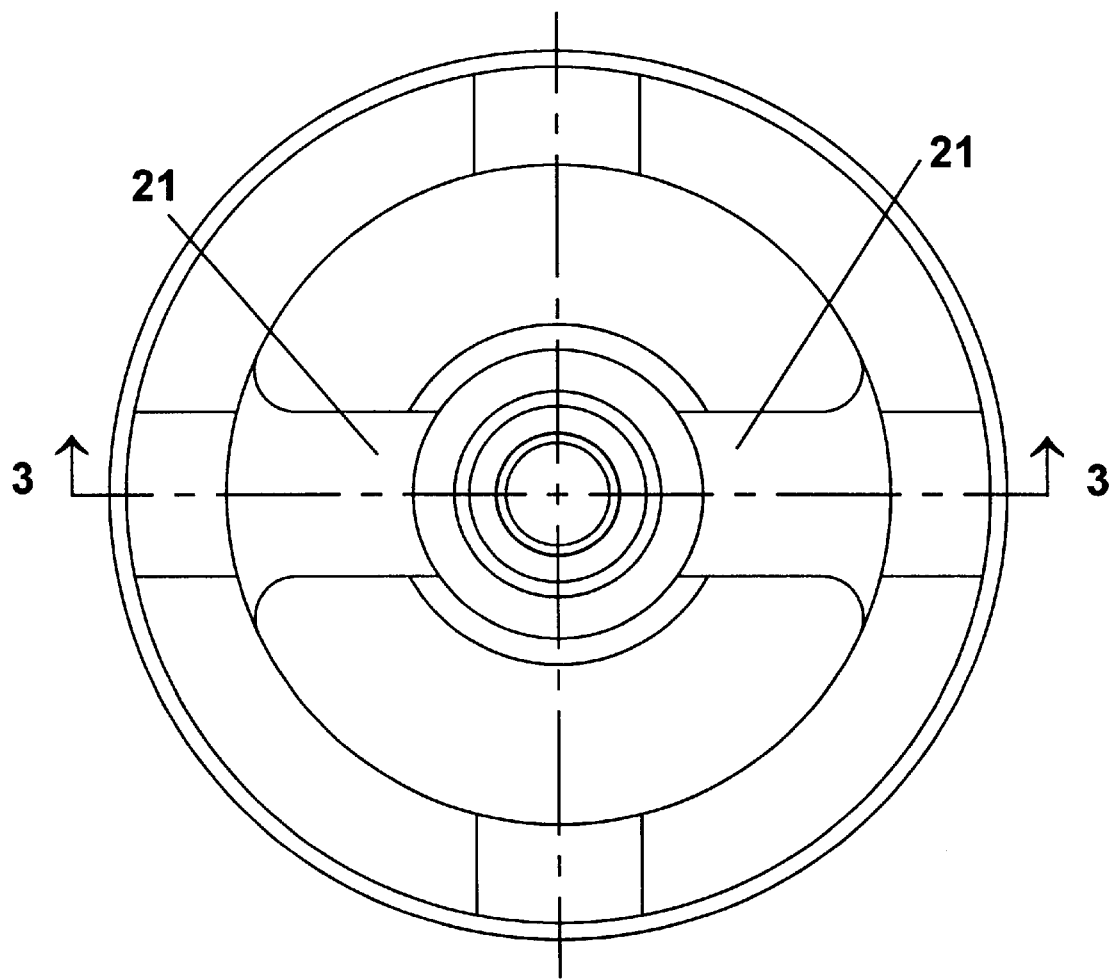
FIG. 2 is an enlarged section through the assembly taken at line 2—2 in FIG. 1 and viewed in the direction of the arrows.
Figure 3:
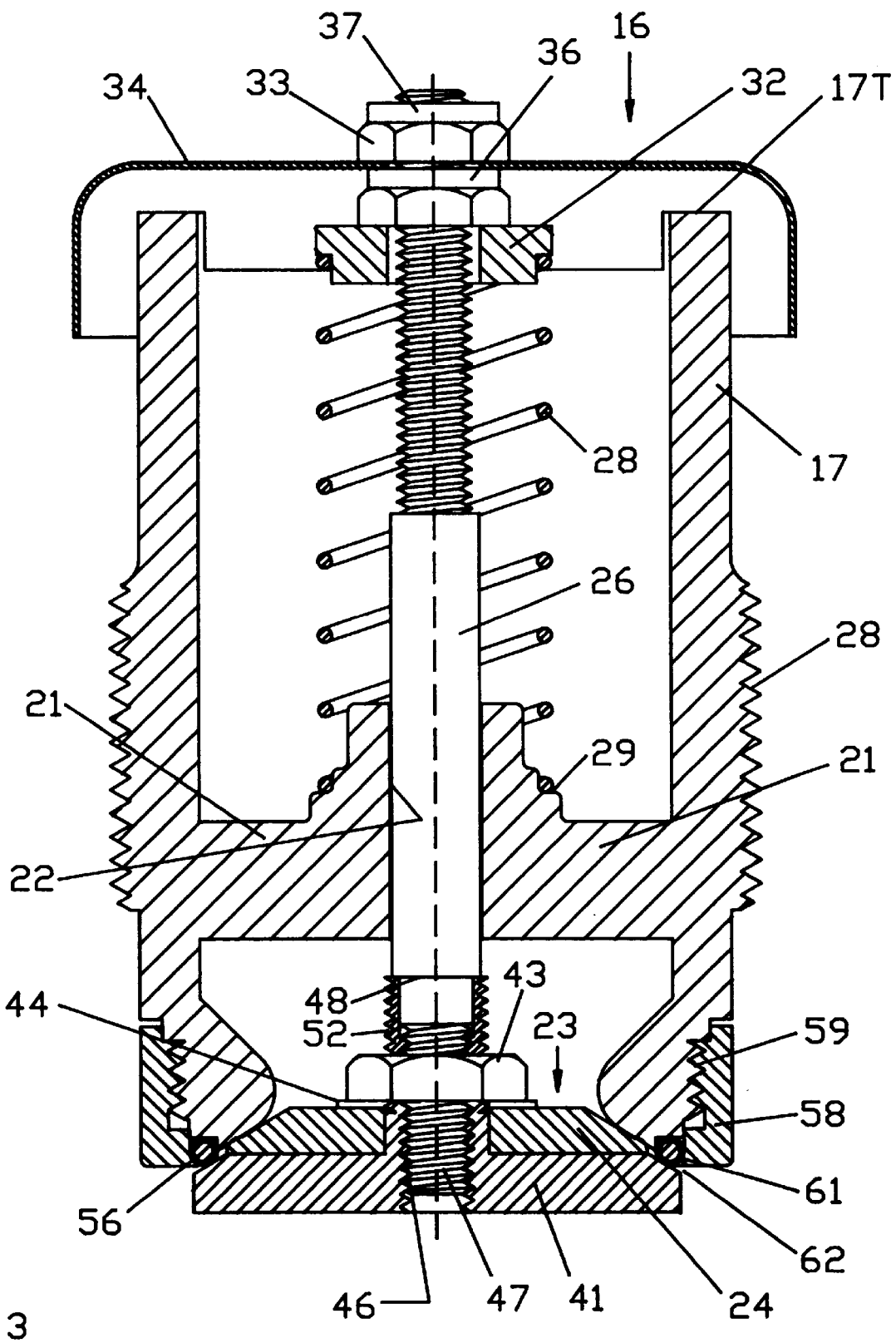
FIG. 3 is a vertical section through the limiter assembly taken at line 3—3 in FIG. 2 and viewed in the direction of the arrows.

Referring now to FIGS. 2 and 3, the limiter assembly includes a valve body 17 having external threads 18 by which it is screwed (typically a pipe thread) into a fitting 19 (FIG. 1) welded in the top of the tank. The valve body has a web 21 with a valve stem guide hole 22 in its center. A somewhat venturi-shaped opening at the lower end of the body 17 serves as a seat for the primary valve seal member 24 mounted at the lower end of the valve stem 26. The valve stem is supported by a coil spring 28 whose lower end is seated on a spring seat ledge 29 at the hub of the web 21. The upper end of the valve spring is seated on a flange 31 of the washer 32 whose position on the valve stem is determined by the adjusting nut 33 threaded onto the valve stem. A valve cover cup 34 rests atop a washer 36 and is held tightly against the washer by the nut 37 also threaded on the valve stem 26.

The valve seal member 24 is mounted to the top of a seal retainer disk 41 which has an externally threaded center post 42 on which a nut 43 is threaded to bear against the washer 44 on top of the seal 24 to provide an assembly of seal and retainer disk which is then screwed onto the lower end of the valve stem. This is done with the internal threads 46 of the retainer disk and post threaded onto the external threads 47 of the lower end of the valve stem. It is so-threaded until the upper end of the post 42 abuttingly engages the shoulder or step 48 on the valve stem.

Figure 4:
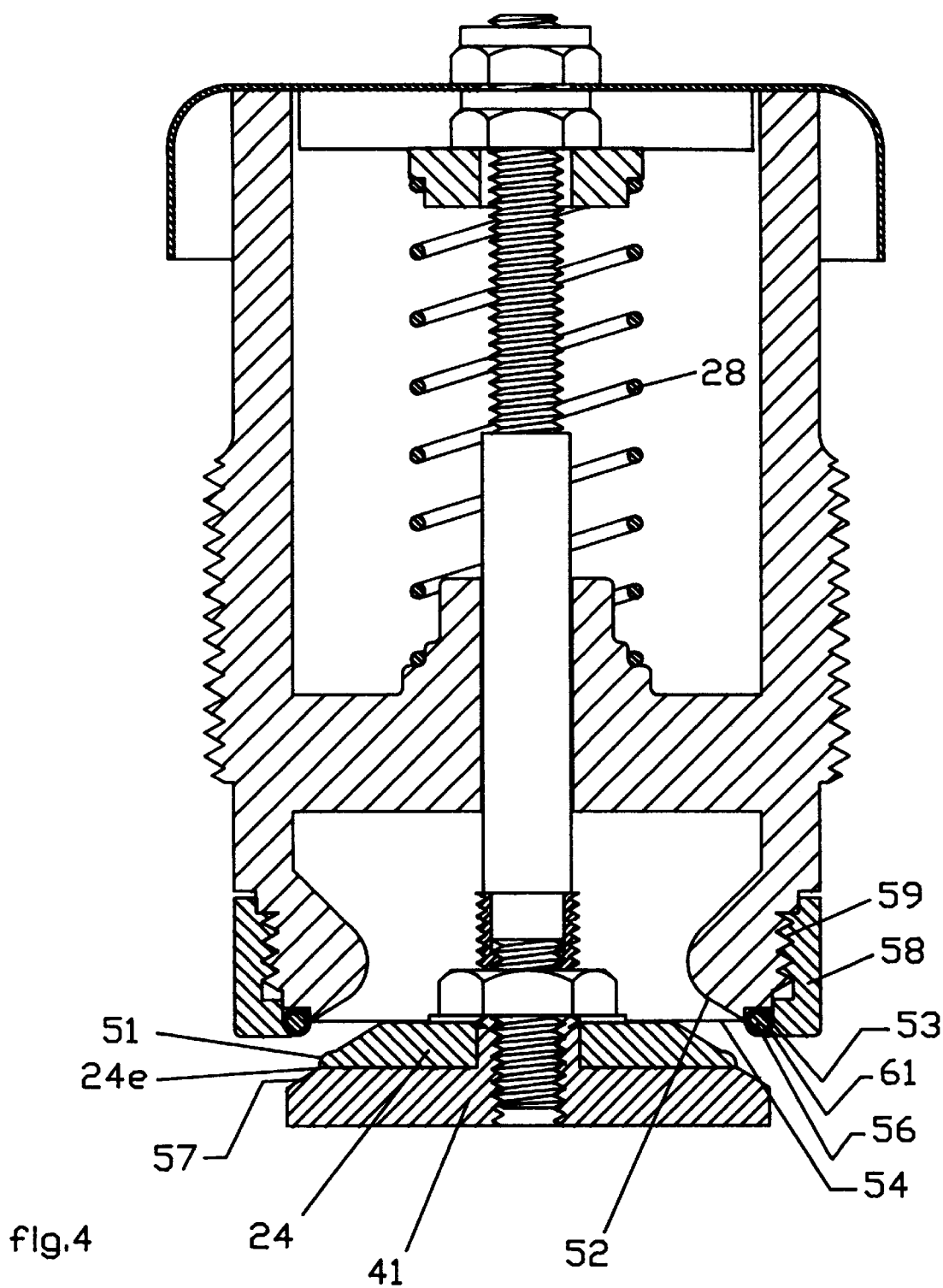
FIG. 4 is a section like FIG. 3 except showing the valve open.

As can be seen in FIG. 4, in the preferred embodiment, the seal member 24 is formed with a radiused rib 51 at its upper outer edge and which engages the seal seat on a circle at 52. There is a step 53 in the bottom of the valve body 17 immediately above the lower edge 54 of the valve body 17. This edge 54 is immediately inboard a seal shield 56 according to the present invention and which, in the illustrated embodiment, is an O-ring having a soft elastomeric core and externally coated with Teflon-brand plastic. Thus, it has the desired elastomeric properties to provide a thin-line seal on the chamfered face 57 of the seal retainer disk 41 while the main sealing function of the primary seal member 24 on the seat 52 is established and maintained in place by the adjustment of the compression of spring 28 by the location of the nut 33 on the valve stem 26. The seal shield is retained in place by the shield retainer ring 58 screwed onto the external threads 59 at the lower marginal portion of the valve body 17. The ring 58 has an inwardly curved lower flange 61 fitting the outer diametrical surface of the shield ring 56 to capture the shield in the pocket formed by the step 53 and retainer ring 58. Thus, as shown in FIG. 3, with the valve closed, the primary sealing function is provided by the primary seal member 24 which is shielded by the shield ring 56 which closes the gap 62 between the shield retaining ring 58 and the seal retaining disk 41 at 62. Therefore, the outer edge 24e of the primary seal member 24 is protected from contact with the liquid cargo or vapors therefrom at all times. Even when the valve is opened to relieve the vacuum, the flow through the passageway is from out to in so that the vapors still are excluded from contact with the seal member 24.

While the foregoing description discloses the use of a Teflon encapsulated O-ring for the seal shield 56, a solid Teflon or a Teflon lip seal might also be used. It is believed that, even where the encapsulated O-ring construction is used, a complete circle of contact on the chamfer 57 about the axis of the valve stem might not be necessary. It is preferred that the gap at any location does not exceed 0.001 to 0.003 inches. Also, it should be understood that, while the Teflon brand of material is currently preferred, it is conceivably that flexible materials which are even more inert or immune to attack from a wider variety of chemicals, might eventually be developed and employed according to the present invention. Also, while the preferred material for the primary seal 24 is a Viton or EPDM material, others might also be found suitable for the primary seal to be protected by the seal shield according to the present invention.

It seem that there is a practice in the field, for users of tank cars to occasionally step down on the top of a conventional vacuum limiter valve to see if it will open, and thus assure the user that it is not jammed closed. While that type of testing is not usually recommended for such valves, the present invention does not preclude the use of that technique, as there is space between the underside of the cover cap 34 and the top 17T of the valve body to enable the valve stem to be pushed down manually by hand, or by foot as seems to be the practice with conventional valves in the field. Such a practice will not damage the valve or shield of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A tank vacuum limiter assembly comprising:

a tank having an opening therein;

a valve body sealed in said opening and having a passageway therethrough;

a primary seal in the valve body and normally closing the passageway through the valve body in the absence of a pressure differential between the outside of the tank and the inside of the tank; and a seal shield between the primary seal and the interior of the tank;

the primary seal including a seat on the valve body and surrounding the passageway, and a resilient seal member normally sealingly engaged with the seat and having a retainer movable relative to the valve body to move with the resilient seal member when the resilient seal member moves into and out of sealing engagement with the first seat;

the seal shield including a second seal member stored in sealing engagement on the valve body, the second seal member normally engaging said retainer between the seat and the interior of the tank and shielding the resilient seal member from the interior of the tank, said resilient seal member being movable simultaneously with the retainer for simultaneously closing the primary seal and engagement of the second seal member with said retainer to shield the resilient seal member from the interior of the tank;

the resilient seal member and shield are circular;

the shield retainer is received in a groove in the valve body; and shield retainer ring is threaded onto the valve body;

the shield retainer ring cooperating with the groove in the valve body to capture the shield in the groove.

2. The assembly of claim 1 and wherein:

the shield is an O-ring encapsulated with an inert plastic material.

3. The assembly of claim 2 and wherein:

the material is a polytetrafluroethylene.

\* \* \* \* \*

UNITED STATES PATENT AND TRADEMARK OFFICE
CERTIFICATE OF CORRECTION

PATENT NO : 5,960,823
DATED : October 5, 1999
INVENTOR(S) : Larry C. Wilkins

It is certified that error appears in the above-identified patent and that said Letters Patent are hereby corrected as shown below:

In column 4, line 40, please delete the word "retainer".

Signed and Sealed this

Eighth Day of May, 2001

Attest:

NICHOLAS P. GODICI

Attesting Officer     Acting Director of the United States Patent and Trademark Office